United States Patent [19]
Allen

[11] Patent Number: 5,932,164
[45] Date of Patent: *Aug. 3, 1999

[54] PROCESS FOR INJECTION MOLDING WITH INCREMENTAL INITIAL EJECTION

[75] Inventor: Paul E. Allen, Newtown, Conn.

[73] Assignee: Logic Corporation, Sandy Hook, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/775,420

[22] Filed: Dec. 31, 1996

[51] Int. Cl.⁶ .................................................. B29C 45/40
[52] U.S. Cl. ...................... 264/328.1; 264/334; 264/335; 425/556; 425/577; 425/438
[58] Field of Search ................................. 264/328.1, 334, 264/335, 336; 425/556, 554, 577, 437, 444, 441, 438

[56] References Cited

U.S. PATENT DOCUMENTS

| | | | |
|---|---|---|---|
| 4,756,865 | 7/1988 | Von Holdt | 264/336 |
| 4,777,004 | 10/1988 | Galer | 425/556 |
| 4,935,187 | 6/1990 | Vente et al. | 264/336 |
| 4,935,188 | 6/1990 | Sorensen | 264/335 |
| 5,145,630 | 9/1992 | Schad | 425/556 |
| 5,171,585 | 12/1992 | Onisawa et al. | 425/556 |
| 5,281,385 | 1/1994 | Julian | 425/556 |
| 5,419,865 | 5/1995 | Ogata et al. | 264/336 |
| 5,490,966 | 2/1996 | Peterson et al. | 425/556 |
| 5,716,582 | 2/1998 | Brown et al. | 264/334 |
| 5,824,256 | 10/1998 | Ballester | 264/334 |

FOREIGN PATENT DOCUMENTS

| | | | |
|---|---|---|---|
| 1-316251 | 12/1989 | Japan | 264/335 |
| 2-281918 | 11/1990 | Japan | 264/335 |
| 5-77248 | 3/1993 | Japan | 264/335 |

*Primary Examiner*—Jill L. Heitbrink
*Attorney, Agent, or Firm*—Ware, Fressola, Van der Sluys & Adolphson LLP

[57] ABSTRACT

A method of molding plastic parts, particularly those with low draft angles, textured surfaces or other mold release challenges, comprising the steps of placing a cavity substantially defining the exterior of the plastic part and a core substantially defining the interior of the plastic part into position defining the plastic part therebetween and injecting heated thermoplastic between the cavity and the core to form the plastic part. The molding machine is then operated to simultaneously withdraw the core and incrementally eject the plastic part from the core by an incremental ejection distance insufficient to disengage the plastic part from the core, wherein the plastic part is supported by the cavity during the incremental ejection from the core. The molding machine is next operated to withdraw the core and the part engaged thereon from the cavity, and fully eject the part from the core. The incremental ejection breaks the adhesion between the part and the core while the part is supported in the cavity, making full ejection of the part easier.

16 Claims, 5 Drawing Sheets

PROCESS FOR INJECTION MOLDING WITH INCREMENTAL INITIAL EJECTION

FIELD OF THE INVENTION

The invention herein relates to a process for injection molding parts, and especially parts having low draft angles, the process including incremental initial ejection of the part from the mold core.

BACKGROUND OF INVENTION

The injection molding of relatively deep parts, such as waste baskets or other open-top containers, utilizes a mold having a cavity defining the exterior of the part, and a core, which extends into the cavity and defines the interior of the part. Heated thermoplastic is injected between the cavity and the core to form the part. Typically, the molded part is retained on the core as the core is removed from the cavity. Thereafter, ejectors separate the part from the core. This is also known as "stripping" the part.

The mold is, of course, cooler than the plastic and receives heat transferred from the plastic so that the plastic will set in the desired shape of the molded part. Molds usually have coolant passages for circulating coolant in order to remove heat from the mold and solidify the plastic part. As the molded part cools, it contracts and attains a tight, gripping fit on the mold core. In the case of a relatively deep molded part, such as a waste basket or other part having a sidewall of substantial height, the contraction of the part may cause difficulty in removing the part from the core. More particularly, the part shrinks to the core and therefore requires substantial force to release it. The molding machines generally contain part ejectors for applying force to the open end or lip of the part, with the object of axially removing the part from the core. However, if the part has shrunk too tightly to the core, the sidewall of the part may deform in the course of attempting to remove the part, leaving stress marks on the side of the part. When the part wrinkles rather than releasing cleanly from the core, the part must be rejected and scrapped.

Although some relief from this problem may be obtained by proper lubrication of the core, for example, with zinc stearate, it is usually necessary to provide the part with a substantial draft angle. The draft angle is the angle at which the part widens from its base to its lip. There are various formulas available in the molding art for calculating the draft angle for a particular part. A typical draft angle for a 20 inch high waste basket is 1½°, and is often greater if a textured surface is provided.

Although some draft angle is often desirable, e.g., so that the completed parts may nest or partially nest for shipping and storage, it is often necessary to increase the draft angle beyond that necessary for nesting. Thus, some parts are not as useful as they might be. For example, containers having a smaller base area than top opening area may be top heavy, or may have less than the desired volume given the footprint on a surface, the footprint being determined by the top size. Other parts, for example, a deep box with substantially vertical sidewalls, simply cannot be made because of the requirement of a draft angle in the molding process.

An alternative to high draft angles is to withdraw the core while leaving the part in the cavity. The bond between the part and the core can be broken by use of compressed air or the like, which will not distort the part while the part is retained in and supported by the cavity. However, this process requires an extra step of removing the part from the cavity.

As discussed above, some parts have a tendency to be retained on the mold core, but some parts have a tendency to be retained in the cavity rather than on the core. This is particularly true of parts having a textured exterior surface which, as the part begins to harden, forms an interference fit with the surface of the cavity. Such textured parts may not be released and withdrawn with the core, and may also be difficult to remove from the cavity by cavity ejectors. Again, the art teaches increased draft angles as the solution, adding 1° to 1½°, of draft angle for each 0.001" of texture or other pattern depth.

Other parts may, by nature of their configuration, also tend to be retained within the mold cavity or retained on the mold core in such a manner that ejection of the part causes damage. In some instances, a longer cooling period before ejection protects the part, but costs cycle time. Therefore, there is a distinct need for a molding process which is capable of producing a part with a low draft angle, textured surfaces and the like, and which reliably removes the part from the mold without damage to the part, at efficient cycle times.

SUMMARY OF THE INVENTION

Accordingly, it is a principal object of the invention to provide a method of injection molding parts which efficiently removes parts from the mold.

It is another object of the invention to provide a method of injection molding parts having a low draft angle using a two-piece cavity and core mold.

It is an additional object of the invention to provide a method of injection molding parts having a low draft angle in which the finished parts are ejected from the core.

It is a further object of the invention to provide a method of injection molding parts which have a textured surface.

It is yet another object of the invention to provide a method of injection molding parts which minimizes stress and possible damage to parts as they are removed from the mold.

It is a further object of the invention to provide a method of injection molding parts at productive mold cycle rates.

It is also an object of the invention to provide a method of injection molding parts having a low draft angles and textured surfaces utilizing the capabilities of available molding machines.

A method of injection molding thermoplastic parts according to the invention herein comprises the steps of placing a core within a cavity in a position to define the shape of the plastic part and injecting heated thermoplastic to form the part. Thereafter, while the plastic part is supported by the cavity, the core is incrementally withdrawn from the cavity as the plastic part is simultaneously incrementally ejected from the core, thereby breaking the adherence between the plastic part and the core but maintaining the plastic part engaged on the core at an incrementally displaced position. The incrementally withdrawal of the core also permits the plastic part to contract from the cavity surface. The method then includes the step of withdrawing the plastic part and core from the cavity, including separation of the cavity as required if the cavity includes two or more parts. The method thereafter includes ejecting the plastic part from its incrementally displaced position on the core.

According to one aspect of the invention, an ejector is used to hold the plastic part against the cavity as the core is incrementally withdrawn. According to another aspect of the invention, the plastic part is held against the cavity by pressurized air introduced between the core and the plastic part as the core is incrementally withdrawn from the plastic part. According to further aspects of the invention, the plastic part is held within the cavity by a combination of ejectors and pressurized air introduced between the plastic part and cavity.

According to other aspects of the invention, the core is incrementally withdrawn and the plastic part is simultaneously incrementally ejected by a distance greater than about 0.010". The incremental ejection distance may also be less than 0.500". The incremental ejection distance varies, depending upon the shape and surface of the plastic part and the thermoplastic used to mold it.

According to still further aspects of the invention, the mold is provided with a textured surface for molding a textured surface onto the part, wherein the step of incrementally withdrawing the core from the cavity and plastic part supported therein also assists in removing the textured plastic part from the textured mold.

These and other objects and features of the invention will in part be recognized by those skilled in the art and will in part appear in the following description of the preferred embodiments and the claims, taken together with the drawings.

DRAWINGS

The same reference numerals reply to the same elements throughout the various Figures.

DESCRIPTION OF PREFERRED EMBODIMENT

The invention herein relates to a method of injection molding parts which facilitates release and removal of the parts from the mold. It is especially useful in molding parts having low draft angles, textured surfaces, or other difficult mold release tendencies. The method will be described with reference to molding a planter pot 10 utilizing a molding machine 20 operated in accordance with the method steps of the invention.

Figure 5:
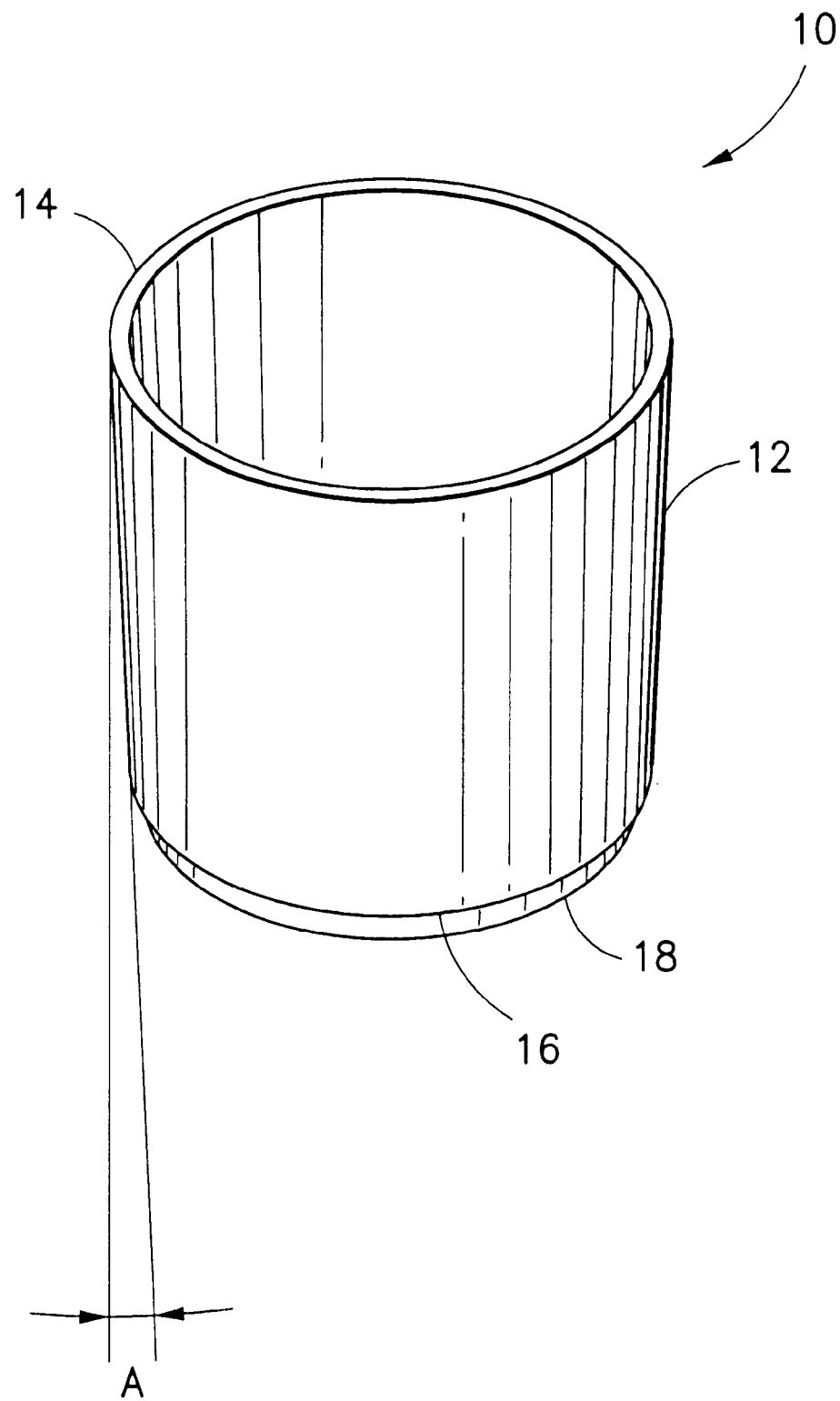
FIG. 5 is a perspective view of the plastic part produced according to the method of the invention herein as illustrated in FIGS. 1–4.

With reference to FIG. 5, the planter pot 10 has a generally cylindrical sidewall 12 which extends from an upper end or lip 14 to a bottom 16. In the embodiment shown, the bottom 16 includes a depending base 18 stepped inwardly from the sidewall 12. The sidewall 12 of the planter pot 10 has a height of approximately five inches, and the diameter of the planter pot is approximately six and one-half inches. The thickness of the sidewall 12 is approximately 0.080 inches and the planter pot is fabricated of general purpose styrene plastic.

The planter pot 10 is molded by a process in accordance with the invention herein, as further illustrated in FIGS. 1–4, and therefore may be provided with a low draft angle. The draft angle is the angle A at which the sidewall 12 decreases between the top 14 and the bottom 16, and for the planter pot 10, the draft angle is one-half degree (½°).

With reference to FIGS. 1–4, the molding machine 20 comprises a stationary patten 22 having a mold plate 23 mounting the cavity section 24 of the mold. The cavity section 24 of the mold defines a cavity 26, best seen in FIG. 4, which in turn defines the exterior of the sidewall 12 and bottom 16 of the planter pot 10. The stationary patten 22 is supported on four tie bars, tie bars 28 and 29 being seen in the drawing, which slidably guide the movable patten 30 of the molding machine. The patten 30 mounts a second mold plate 32 having the core 34 of the two-part mold extending upwardly therefrom. The core 34 of the mold is shaped to define the interior of the planter pot 10. The patten 30 is supported on pillars 36 and 37 extending from a hydraulic clamping cylinder 38, which moves the patten 30 to reciprocate the mold core 34 in and out of the cavity 26.

Figure 1:
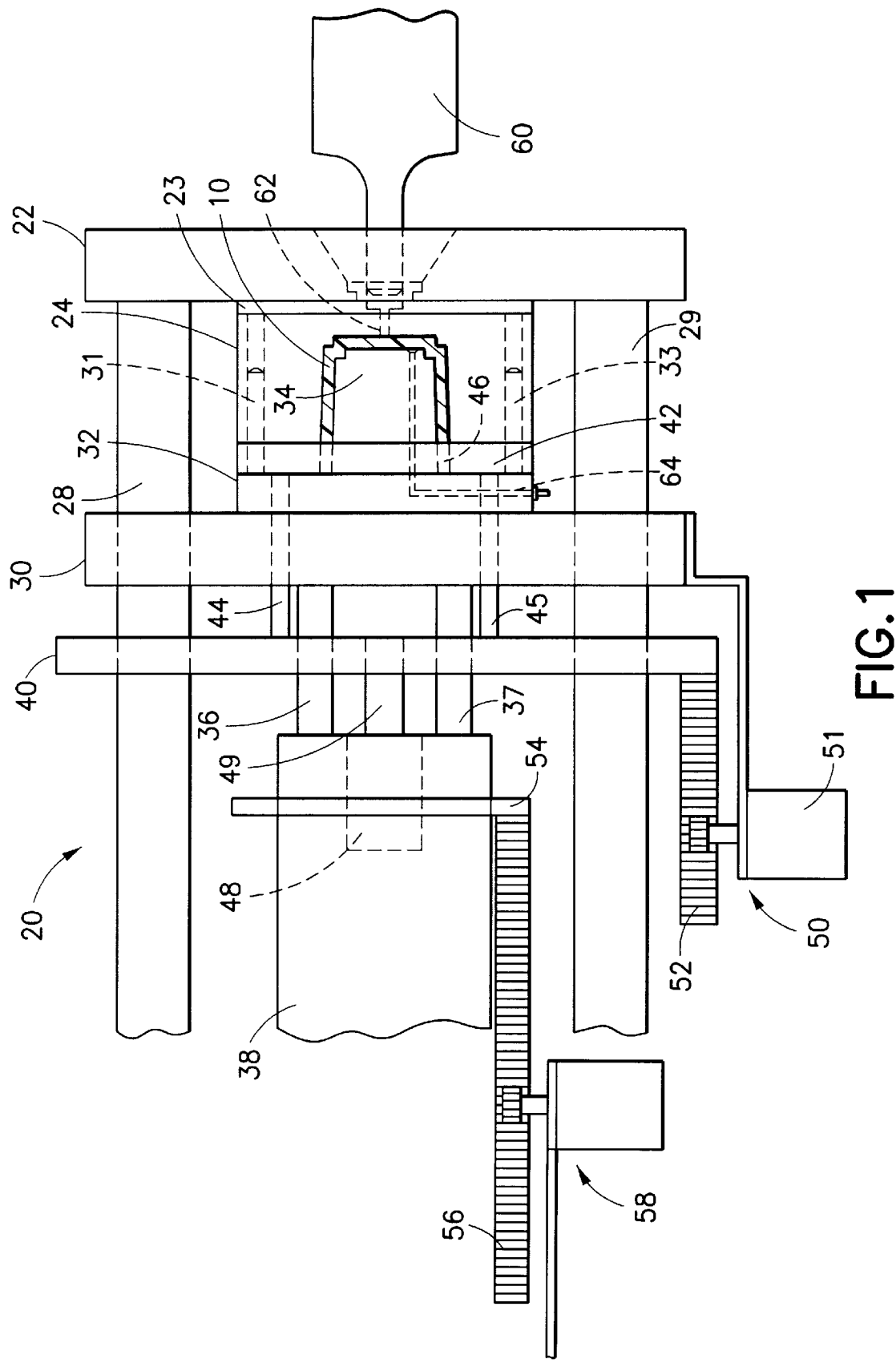
FIG. 1 is a schematic top view of apparatus for injection molding a part according to the method of the invention herein, with the mold closed and a plastic part formed between the cavity and core of the mold.

The molding machine 20 further comprises an ejector patten 40 guided on pillars 36 and 37, and driving an ejector plate 42 by means of ejector bars 44 and 45. The ejector plate slides on leader pins 31 and 33 upstanding from mold plate 32. The leader pins are also received in the cavity section 24 to align the mold section. An annular band 46 of the ejector plate 42 closely surrounds the mold core 34 adjacent mold plate 32 and defines the upper end or lip 14 of the planter pot 10 when the mold is closed, as shown in FIG. 1. The ejector patten 40 is driven by a piston rod 49 extending from an ejection piston 48 carried on the clamping cylinder 38 for movement therewith. Thus, the ejection patten 40 moves with the movable patten 30 but also moves with respect to the movable patten 30 by means of the ejection cylinder 48 and piston rod 49. Also associated with the ejector patten 40 is a linear transducer 50 in the form of an optical comparator 51, mounted on the movable patten 30, driven by a gear rack 52 mounted on the ejector patten 40. The transducer 50 is used to control the maximum upward position and the return position of the ejector patten, and also is used to control the incremental ejection position, as more fully discussed below. The molding machine 20 also generally comprises a bracket 54 connected with the clamping cylinder 38 and supporting a rack 56 of another transducer 58, for controlling the speed, force, etc. of the molding machine, as is well known in the art.

The molding machine 20 also comprises an injection cylinder 60, and the stationary patten 22, mold plate 23 and cavity section 24 define a passage generally indicated at 62 for delivering molten plastic from the injection cylinder 60 to the cavity 26. It will be appreciated that the molding machine further comprises a base supporting the tie bars 28 and 29, the clamping cylinder 38, stationary portion of transducer 58, etc., and the molding machine has the appropriate hydraulic and electrical controls for operation, as is well known in the art. It will further be appreciated that the cavity section 24 of the mold and, in many instances, the core 34 of the mold, have cooling passages therein, and the molding machine 20 has associated with it the appropriate mechanisms for circulating coolant through the coolant passages, again as well known in the molding art.

Lastly, the molding machine 20 has a source of compressed air delivered by conduit 64 to passage 66 in the core 34. Thus, compressed air may be delivered to the surface of the core 34, for purposes described below.

In forming the planter pot 10 or other open top part in accordance with the method of the invention herein, the steps of operation of the molding machine 20 illustrated sequentially in FIGS. 1–4 are performed. With reference to FIG. 1, the movable patten 30 is positioned to insert the core 34 into the cavity 26 with the ejector plate 42 positioned between the mold plate 32 and the cavity section 24. The mold is clamped shut by the cylinder 38, and sometimes by mechanical clamps as well, at this time. The injection cylinder 60 is operated to deliver heated thermoplastic through the passage 62 into the space defined between the cavity section 24, core 34 and the annular band 46 of the ejector plate immediately surrounding the core 34, thereby forming the heated thermoplastic into the planter pot 10. The plastic immediately begins to cool and set, and as it cools and sets, the sidewall 12 of the planter pot 10 contracts into increasingly tighter and gripping contact with the core 34.

Figure 2:
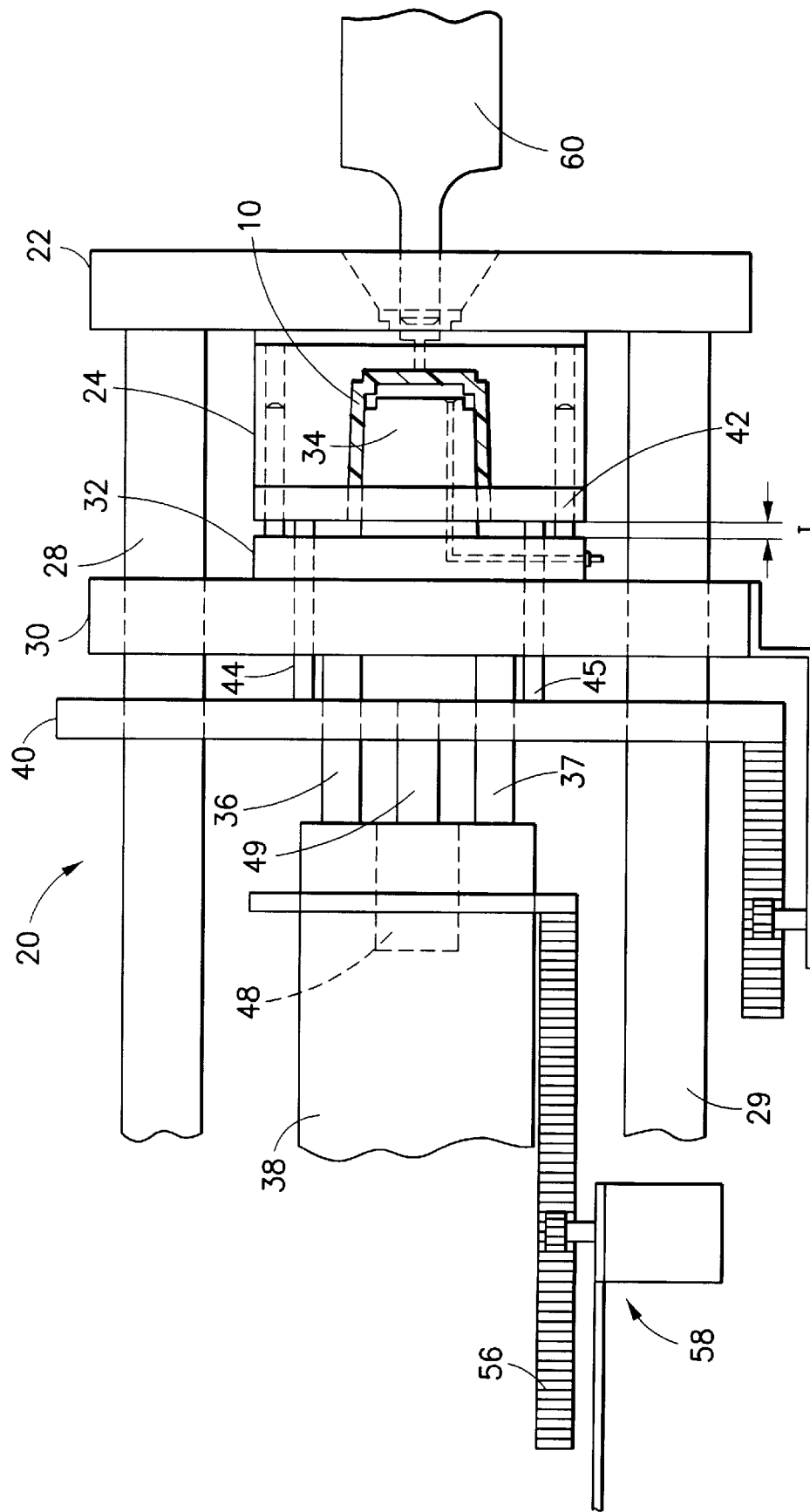
FIG. 2 is a schematic top view of the molding apparatus of FIG. 1, with the plastic part supported in the cavity and incrementally ejected from the mold core.

With reference to FIG. 2, the movable patten 30 is withdrawn from the cavity by an incremental ejection distance I, and the ejector patten 40 is simultaneously operated to separate the ejector plate 42 from the mold plate 30 by the same increment I. This breaks the grip of the plastic planter 10 on the core 34 while the part is still supported by the mold cavity, thus minimizing any tendency of the sidewall of the planter pot to wrinkle or stress from the pressure applied to the lip 14 during this incremental ejection. The incremental ejection is carried out over a distance of as little as 0.010", or such other distance as is sufficient to break the grip of the part of the core but maintain the part engaged on the core for full withdrawal from the cavity and final ejection. The distance will vary with the size and shape of the part, the draft angle, any texture or design of the surface of the part, as well as the type of thermoplastic. An increment of 0.030" is sufficient for a non-textured planter pot 10 with 1° draft. The incremental ejection is carried out by operating the ejection cylinder 48 to drive the ejector patten 40 and thereby the ejector plate 42 while simultaneously operating the clamping cylinder to retract the movable patten 30.

The distance of the incremental ejection is measured and controlled by the optical comparator 58, which provides a convenient means for adjusting the distance to optimize performance. Alternatively, a latch lock system can be employed to permit initial incremental displacement of the movable patten with respect to the ejector plate, and then mechanically hold the increment until the latch lock is released. Also, some molding machines can be adapted to perform the process with micro switches controlling the ejector. In all cases, the principle involved is to start ejection to break adherence between the part and the core, to then stop ejection to stabilize the part at a displaced position on the core as the core and part are withdrawn from the mold cavity, and then to resume ejection to remove the part from the core and separate it from the molding machine. Use of the machine controls and positions transducers, such as the optical comparators 50 and 58, is a preferable way of carrying out the process because of the flexibility in adjusting the increment of ejection, which is best optimized under operating conditions.

If the mold is equipped with compressed air 64, the incremental ejection can be achieved by supplying compressed air to the interior of the planter pot 10 as the core is incrementally withdrawn from the cavity. This also does not distort the planter pot 10, in that it is supported in the mold cavity 26 during incremental ejection. Compressed air may be used in place of or in combination with the ejector plate 42 to achieve the incremental ejection; however, this technique is most useful when there are no problems of adhesion between the part and the mold cavity.

The incremental ejection releases the adhesion between the planter pot 10 or other molded part and the core 34, and also releases the adhesion of the planter pot 10 with the mold cavity 26, in that immediately following the incremental ejection, the sidewall and base portions of the planter pot 10 are freed to contract from the cavity 26 as it cools. This is because even with a low draft angle, the incremental translation of the core relative to the cavity frees the bottom 16 of the planter pot to contract from the mold cavity 26 and also creates some additional spacing between the mold portions forming the sidewall of the planter pot. Thus and as the thermoplastic of the planter pot is contracting, it moves inwardly from the mold cavity to release or diminish any adherence to the mold cavity 26, making the planter pot easier to withdraw.

Figure 3:
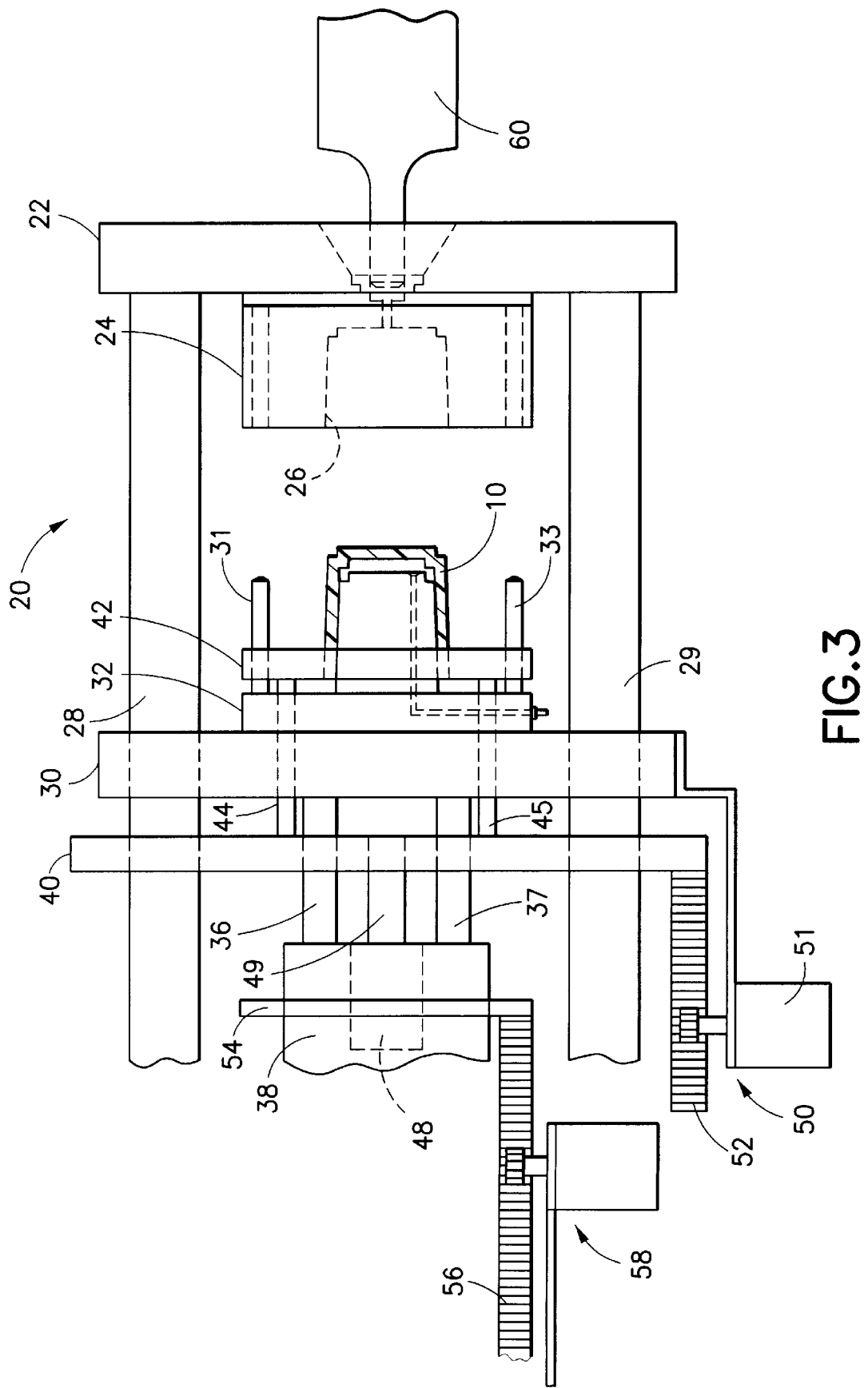
FIG. 3 is a schematic top view of the molding apparatus of FIG. 1, showing the mold core and the incrementally ejected plastic part thereon removed from the mold cavity.
Figure 4:
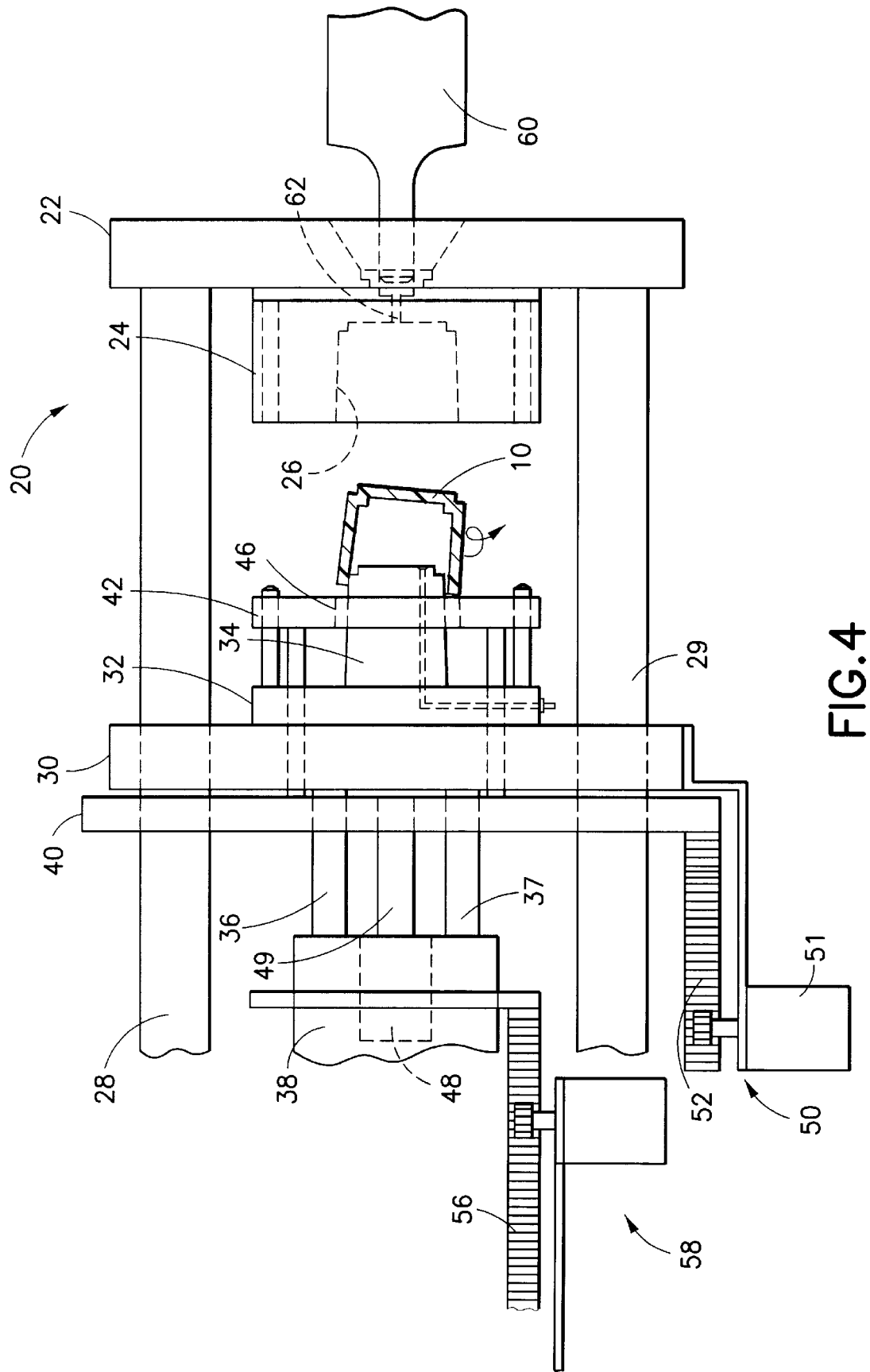
FIG. 4 is a schematic top view of the molding apparatus of FIG. 1, showing the plastic part ejected and separated from the mold core.

With reference to FIG. 3, the movable patten 30 is next operated to remove the core bearing the incrementally ejected planter pot 10 from the cavity, without further operation of the ejector plate until the part is sufficiently clear of the cavity for final ejection. With reference to FIG. 4, the ejector plate 42 is then operated to fully eject the planter pot 10 from the core, whereafter the molding machine is ready for the next cycle.

The initial incremental ejection, which occurs while the planter pot is substantially supported between the cavity and core, does not stress or damage the planter pot or other part being formed. When the final ejection is performed, as illustrated in FIG. 4, the part is already partly ejected and not tightly adhered to the core, so that the forces required for final ejection also do not damage the part. Further, the part is somewhat cooler and therefore more solid and strong, in preparation for final ejection.

The incremental ejection process is particularly useful for injection molding parts with textured outer surfaces or other features or shapes which may cause the part to be retained in the mold cavity. The process follows the steps outlined above; however, the benefit of incrementally withdrawing the core is especially realized from then permitting the texturized surface of the part to contract and separate from the mold cavity prior to withdrawing the core to remove the part.

The incremental ejection process is also useful with parts having extending portions which require a mold cavity of two or more sections. The cavity is maintained closed and may be used in conjunction with the ejector or dispressure to retain the part as the core is incrementally withdrawn. The cavity is then opened to release the part for further retraction of the core and final ejection of the part from the core, without stress or wrinkle damage.

The incremental ejection process does not slow the production of parts. It merely requires that the ejector plate or compressed air, or both, be operated as the core is initially removed from the cavity, and that ejection be completed after the core is sufficiently withdrawn for the part to be ejected clear of the molding machine's next cycle. It can actually increase production rates because the part is protected against high-stresses of ejection permitting more rapid cycling of the molding machine.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of molding a plastic part having a sidewall, comprising the steps of:

A) placing a cavity for substantially defining the exterior of a plastic part including a sidewall thereof and a core for substantially defining the interior of the plastic part including the sidewall thereof into position defining the plastic part therebetween;

B) injecting heated thermoplastic between the cavity and the core to form the plastic part;

C) simultaneously withdrawing the core and incrementally axially and substantially non-rotationally slidingly ejecting the plastic part along the core by an incremental ejection distance insufficient to disengage the sidewall of the plastic part from the core, wherein the plastic part is supported by the cavity during the incremental ejection along the core;

D) withdrawing the core and the plastic part engaged thereon from the cavity; and E) fully ejecting the plastic part from the core.

2. The method as defined in claim 1 and further comprising the step of:

F) while incrementally ejecting the plastic part from the core, holding the plastic part in the cavity.

3. The method as defined in claim 2 wherein the step of holding the plastic part in the cavity comprises engaging the plastic part with at least one mechanical ejector associated with the core and operating the ejector to simultaneously incrementally eject the plastic part from the core and maintain the plastic part supported in the cavity.

4. A method as defined in claim 3 and further comprising the step of positioning the mechanical ejector around the core such that the mechanical ejector forms a top of the plastic part.

5. A method of molding a plastic part as defined in claim 3 wherein the incremental ejection distance is greater than about 0.010 inches.

6. A method of molding a plastic part as defined in claim 3 wherein the incremental ejection distance is less than about 0.50 inches.

7. A method of molding a plastic part as defined in claim 2 wherein the step of holding the plastic part in the cavity comprises introducing pressurized air between the core and the plastic part while withdrawing the core with respect to the plastic part.

8. A method of molding a plastic part as defined in claim 7 wherein the step of holding the plastic part in the cavity further comprises engaging the plastic part with at least one mechanical ejector associated with the core and operating the mechanical ejector to simultaneously incrementally eject the plastic part from the core and maintain the plastic part supported in the cavity.

9. A method of molding a plastic part as defined in claim 1 wherein the withdrawal of the core is continuous and there is a pause between the incremental and full ejection of the plastic part from the core.

10. A method of molding plastic part as defined in claim 1 wherein the exterior of the plastic part has one or more protruding portions and the step of placing a cavity defining the exterior of the plastic part includes providing the cavity in two or more parts and further comprising the step of:

F) after incrementally ejecting the plastic part along the cores separating the cavity from the exterior of the plastic part.

11. A method of molding a plastic part as defined in claim 1 wherein the plastic part has a draft angle of less than one degree.

12. A method of molding a plastic part as defined in claim 1 wherein the plastic part has a draft angle of approximately one-half degree.

13. A method of molding a plastic part as defined in claim 1 wherein the plastic part has a textured exterior surface on at least a portion of the sidewall thereof.

14. A method of molding a plastic part as defined in claim 1 wherein the incremental ejection distance is greater than about 0.010 inches.

15. A method of molding a plastic part as defined in claim wherein the incremental ejection distance is less than about 0.50 inches.

16. A method of molding a plastic part having a sidewall comprising the steps of:

A) placing a cavity defining the exterior of the plastic part and a core defining the interior of the plastic part into position substantially defining the shape of the plastic part, including the sidewall thereof, therebetween;

B) injecting heated thermoplastic between the cavity and the core to form the plastic part;

C) while the plastic part is supported by the cavity, incrementally axially and substantially non-rotationally slidingly withdrawing the core with respect to the plastic part by a distance which maintains the sidewall of the plastic part engaged on the core at an axially displaced position along the core;

D) withdrawing the core and the plastic part engaged thereon from the cavity; and E) ejecting the plastic part from the core.

* * * * *

UNITED STATES PATENT AND TRADEMARK OFFICE
CERTIFICATE OF CORRECTION

PATENT NO. : 5,932,164
DATED : August 3, 1999
INVENTOR(S) : Paul E. Allen

It is certified that error appears in the above-identified patent and that said Letters Patent is hereby corrected as shown below:

In column 8, line 13, "cores" should be --core,--.

In column 8, line 27, "claim" should be --claim 1--.

Signed and Sealed this

Eleventh Day of April, 2000

Attest:

Attesting Officer

Q. TODD DICKINSON

Director of Patents and Trademarks